United States Patent [19]

Knies

[11] Patent Number: 4,641,851
[45] Date of Patent: Feb. 10, 1987

[54] AUTOMATIC LATCH BETWEEN TRAILER AND BOAT

[76] Inventor: Rudy D. Knies, 6609 State Rd. 31 E., Sellersburg, Ind. 47172

[21] Appl. No.: 824,954

[22] Filed: Jan. 31, 1986

Related U.S. Application Data

[63] Continuation-in-part of Ser. No. 698,658, Feb. 6, 1985, abandoned.

[51] Int. Cl.⁴ .............................................. B60P 3/10
[52] U.S. Cl. .................................. 280/414.1; 114/344
[58] Field of Search ..................... 280/414.1, 508, 509; 114/344; 292/128, 121, 130, 136, 238, 230, 219, 228

[56] References Cited

U.S. PATENT DOCUMENTS

| | | |
|---|---|---|
| 1,016,422 | 2/1912 | Lauritsen ........................... 292/121 |
| 3,750,805 | 8/1973 | Finney ............................... 280/414.1 |
| 3,831,790 | 8/1974 | Farris ................................ 280/414.1 |
| 4,463,965 | 8/1984 | Lawson ............................. 280/414.1 |

OTHER PUBLICATIONS

P. 94, "American Builder," Jul. 1946, J. Brown.

Primary Examiner—John A. Pekar
Attorney, Agent, or Firm—Richard L. Caslin

[57] ABSTRACT

An automatic latch is mounted on the front of a self-loading boat trailer to the fixed upright framework that includes a bow-receiving cradle. The latch member has a central transverse pivot. The rear end of the latch has an upwardly and forwardly inclined hook, while the front end of the latch has a counterweight normally urging the hook in a raised position. The forward loading movement of the boat onto the trailer causes a boat eye mounted on the bow of the boat to deflect the hook into a lowered position until the counterweight returns the hook to a raised position so the hook interlocks with the boat eye. An adjustable handle is mounted on the framework, and it cooperates with a tension spring, where the spring is relaxed during a boat-loading operation, and the spring is loaded during a boat-unloading operation so that the latch automatically disconnects itself from the boat eye during unloading. An improved version of this automatic latch has the front end of the pivoted latch member fitted with both an inclined hook portion and a counterweight, while the rear end of the latch supports one end of a tension spring and the other end of this same spring is joined to the adjustable handle.

14 Claims, 13 Drawing Figures

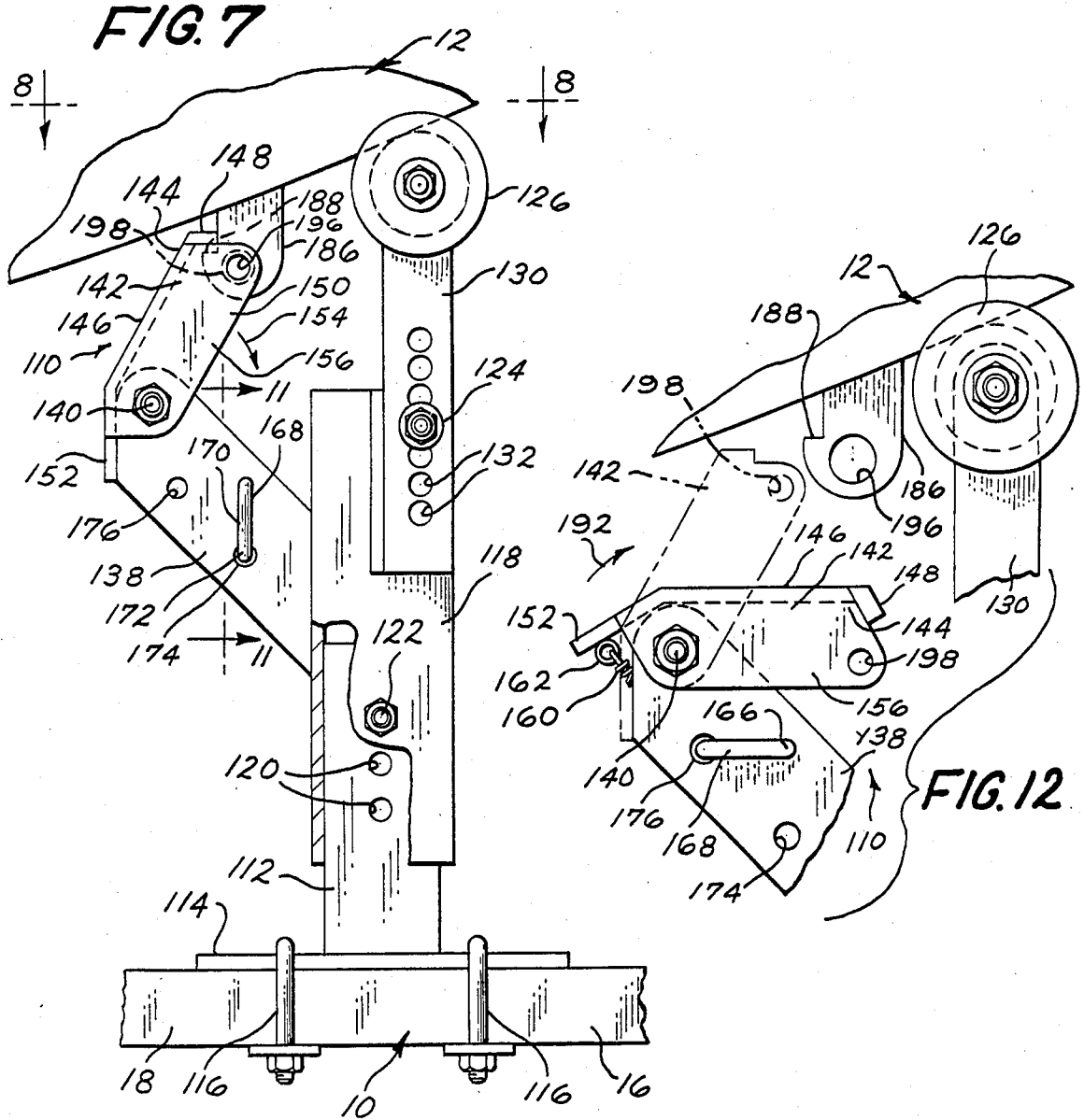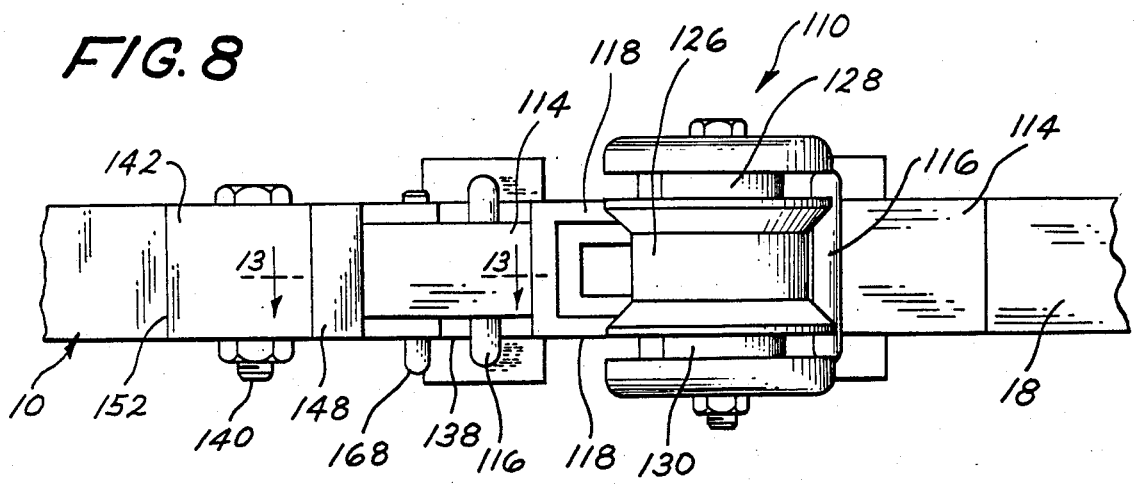

AUTOMATIC LATCH BETWEEN TRAILER AND BOAT

BACKGROUND OF THE INVENTION

This application is a continuation-in-part application of my copending patent application Ser. No. 698,658, filed Feb. 6, 1985, now abandoned.

1. Field of the Invention

This invention relates to the art of self-loading boat trailers and, particularly, the art of automatic locking means built onto the front end of a self-loading boat trailer for latching with a hook member on the bow of the boat when the boat is propelled onto the trailer that is partially submerged at a boat ramp.

2. Description of the Prior Art

The use of trailers for transporting, launching or retrieving pleasure boats are widely used by the boating public. Prior to the last decade, most commercially available boat trailers utilized a combination of a winch and tow rope for retrieving boats from the water onto a boat trailer. One major disadavantage inherent in the use of a winch and tow rope is that at least two are required to effectively retrieve and load the boat. One person is normally needed to connect the towline to the bow of the boat and then to operate the winch. The other person is required to navigate and maintain the boat in alignment with the boat trailer.

The Anderson U.S. Pat. No. 3,938,829 describes an automatic lock between a boat and its trailer. The front of the boat is provided with an elongated, U-shaped eyelet that is vertically fixed to the bow of the boat. A support member for an automatic latching device is positioned at the front of the trailer, and it has a bow-conforming guide member that includes a spring-loaded, slidable locking bar that is capable of being moved by the eyelet and of latching within the eyelet as the eyelet passes forwardly of the locking bar.

The Whitlock U.S. Pat. No. 3,963,263 describes an automatic latch on the front of a trailer for engagement with the bow eye of the boat. There is a pair of spring-biased, L-shaped crank arms called strikers which open when struck by the bow eye and which automatically close behind the eye as the eye moves forwardly of the trailer.

The Robinson U.S. Pat. No. 3,989,267 describes an automatic latch between a trailer and its boat. The front of the boat has a bow ring that is adapted to be locked to a stanchion supported on the front end of the trailer by the operation of the automatic latch. A pair of parallel plates support an elongated locking pin that is spring-biased. There is a pivoted trigger plate that holds the locking pin cocked until the bow ring moves the trigger plate, thereby releasing the locking pin to effect the latching action.

The Boettcher U.S. Pat. No. 4,114,920 describes an automatic latch between the trailer and its boat that is related to the above-cited Robinson patent.

The Finney U.S. Pat. No. 3,750,805 appears to be the earliest patent dealing with automatic latching means between the trailer and its boat. This patent shows a self-loading trailer having a track structure supporting a dolly which is movable the length of the trailer. The dolly has a vertical post supporting, at the top, a catch structure comprising a U-shaped bracket supporting a pivoted, U-shaped yoke member having a front pin which is the locking pin for engagement with the hook member of the bow eye at the front of the boat.

The Lawson U.S. Pat. No. 4,463,965 describes a retaining device mounted on the front of the boat trailer for securing the bow eyelet of a boat to the trailer. This invention needs the standard trailer winch for pulling the boat up onto the trailer. Also the handle for releasing the latching member must be manually operated at the same time the boat is being unloaded from the trailer. This handle cannot be preset and left unattended as in the present invention.

The Farris U.S. Pat. No. 3,831,790 describes a boat-loading and unloading kit for a boat trailer where the kit comprises a four wheeled carriage that rides on parallel rails. The carriage has a pair of U-shaped arms to engage the bow of the boat. The front end of the rails support a pivoted latch means. The rear end of the latch has a hook portion for engaging the front end of the wheeled carriage. The front end of the latch has a tension spring holding it down. A steel cable is connected at one end to the rear hook of the latch, and the other end of this cable is within reach of the person driving the boat.

Prior to the advent of self-loading boat trailers, standard boat trailers were fitted with winches at the front end of the trailer. The winch had a rope with a hook on the end for engagement with the boat eye of a boat for manually pulling the boat onto the trailer when the rear end of the trailer was submerged in the water at an inclined boat ramp. This makes for a two-man operation, one person in the boat and the other working the winch.

OBJECT OF THE PERSENT INVENTION

The principal object of the present invention is to provide an automatic boat latching device to the framework at the front of a self-loading trailer, where the latch member automatically interlocks with the boat eye during a loading operation, and automatically releases the boat eye during a boat-unloading operation.

A further object of the present invention is to provide an automatic latch member, of the class described, which is counterweighted to urge the hook member into a raised position for use during the boat-loading operation, as well as having an adjustable handle to preset the latch into a releasing position for use during the boat-unloading operation.

A further object of the present invention is to provide an automatic latch member, of the class described, where the adjustable handle is preset either in a boat-loading position or a boat-unloading position, with spring means holding the handle against inadvertent operation.

SUMMARY OF THE INVENTION

The present invention provides an automatic boat latching device that is assembled to a fixed upright framework at the front end of a self-loading boat trailer. This framework includes a bow-receiving cradle. The latch member has a transverse pivot for mounting the latch to the framework. The rear end of the latch has an upwardly and forwardly inclined hook, while the front end of the latch has a counterweight that normally urges the hook to a raised position for use during the boat-loading operation. The hook is for cooperation with a boat eye that is mounted on the bow of the boat. The eye deflects the inclined hook into a lowered position, and the counterweight automatically returns the hook to a raised position where the hook interlocks with the eye. There is an adjustable handle mounted to the framework, and it includes a tension spring that is joined at one end to the latch and at its other end to the handle. This handle may be preset in one position to relax the tension of the spring during a boat-loading operation, or the handle may be preset in another position to increase the tension of the spring during a boat-unloading operation. An improved version of this invention combines both the inclined hook portion and the counterweight located at the front end of the pivoted latch member while one end of the tension spring is connected to the rear end of the pivoted latch. The other end of the tension spring is joined to the adjustable handle which may be preset and left unattended.

BRIEF DESCRIPTION OF THE DRAWINGS

This invention will be better understood from the following description taken in conjunction with the accompanying drawings, and its scope will be pointed out in the appended Claims.

FIG. 7 is a fragmentary, right side, elevational view of a portion of the front end of the boat trailer, similar to that of FIG. 2, except that it is of an improved second modification of the present invention, where the front end of the pivoted latch member is fitted with both an inclined hook portion and a counterweight, while the rear end of the latch supports one end of a tension spring (not shown).

FIG. 8 is a top plan view of the second modification of the automatic latch member of the present invention, taken on the Line 8—8 of FIG. 7, but on an enlarged scale.

FIG. 12 is another fragmentary, right side, elevational view of the automatic latch of this second modification of the present invention showing the adjustable handle in the OFF position, which designation refers to a boat-unloading operation, or boat OFF position, where the tension in the spring is relieved so that the counterweight causes the pivoted latch to be lowered out of engagement with the boat eye.

DESCRIPTION OF THE PREFERRED EMBODIMENTS

Figure 1:
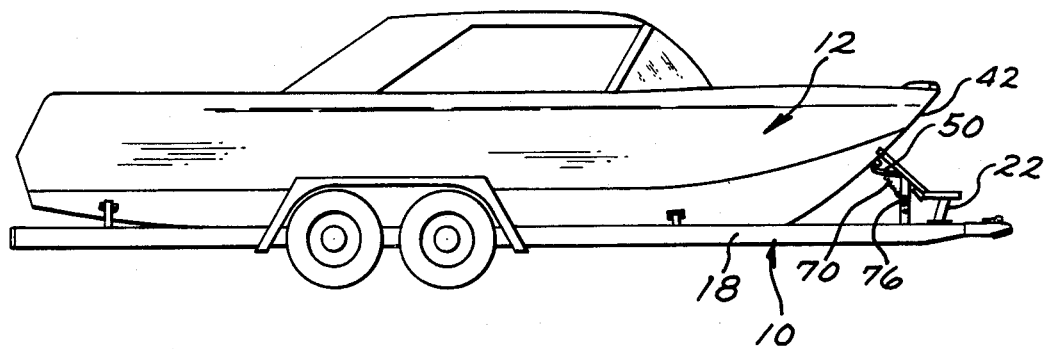
FIG. 1 is a right side elevational view of a self-loading boat trailer that is equipped as a self-loading trailer to have a boat driven thereon, and the boat to be automatically locked in place by the boat latch of the present invention that is located at the front of the trailer.

Turning now to a consideration of the drawings and, in particular, to the right side elevational view of FIG. 1, there is shown a standard self-loading boat trailer 10 that is shown supporting a typical small boat 12. As a rule, most small boats have outboard motors, but this is not illustrated, for the sake of simplicity, since the present invention is located near the front of the trailer 10. The present inventor is an avid bass tournament fisherman, and regional competitions attract hundreds of fishermen and their boats. Hence, much time is spent by all the contestants during both the unloading of the boats into the water, as well as retrieving the boats from the water. Until the last decade, most, if not all, boat trailers were fitted with winches (not shown) at the front end of the trailer, where the winch had a rope and hook for engaging the boat eye when the boat was still in the water. This winch would be used for manually pulling the boat onto the trailer while the rear end of the trailer is still partially submerged in the water at the boat ramp. Within the last decade there has been a technological improvement, in that self-loading trailers have been designed and are widely used such that the boats can be propelled completely onto the partially submerged trailer. Therefore, the winches have become obsolete as far as being needed for pulling the boat onto the trailer. Prior to the present invention, the only purpose of the winch, with its rope and hook, was to lock the boat onto the trailer with the hook engaged in the boat eye so that when the trailer carrying the boat is being pulled from the water, the boat would not slide backward off the trailer.

Figure 6:
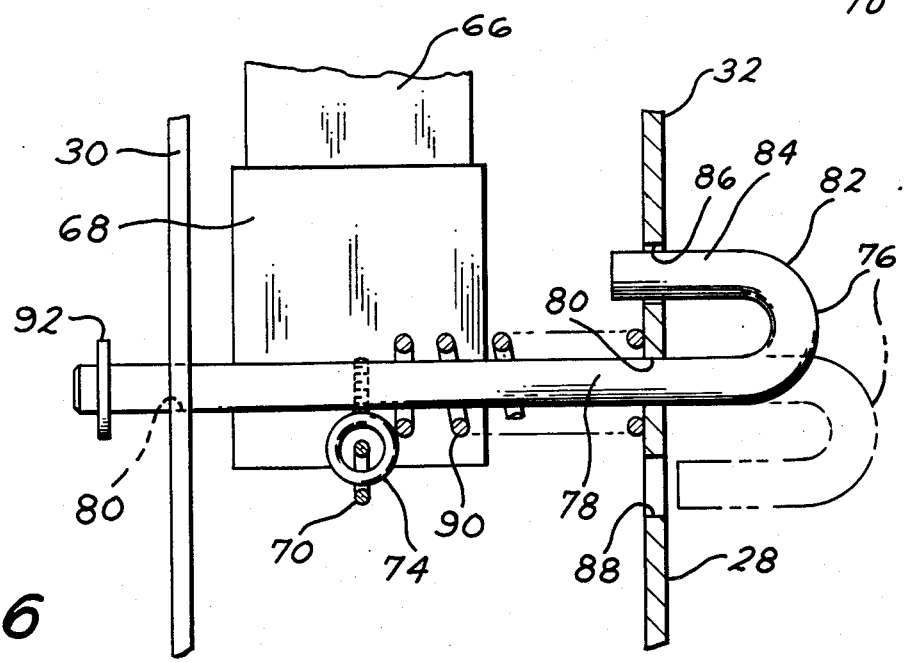
FIG. 6 is a fragmentary elevational view, taken on the Line 6—6 of FIG. 2, looking forwardly of the trailer and showing the operation of the adjustable handle, which handle happens to be set in an OFF position, which designation refers to a boat-unloading operation, or boat OFF position.

Looking at FIG. 2, there is some standard framework 14 which is furnished with the trailer 10, and it will be described first. The chassis 16 of the trailer has side box beams 18 which are reinforced at the front of the trailer by cross braces (not shown) to form a horizontal platform 20. On this platform 20 is built a fixed upright framework 22, including a vertical post 24 that supports a raised shelf 26 that is designed to support the standard winch (not shown) that has been eliminated by the introduction of the present invention. In front of the shelf 26 is a second vertical post 28 which is formed by a pair of parallel plates 30 and 32, as is best seen in FIG. 6. The shelf 26 and this second vertical post 28 cooperate with a pair of inclined struts 34, only one of which is seen in the side view of FIG. 2. It should be understood that this pair of struts 34 are joined at the front end 36 to the rear edge of the shelf 26, while the rear end of the pair of struts 34 are joined together at 38 to support a bow-receiving cradle 40. As is standard in this art, the bow 42 of the boat has a boat eye, or ring, 44 permanently fastened to the center of the underside of the hull. This boat eye 44 was used heretofore in cooperation with the hook on the rope of the winch that would have been mounted on the shelf 26, as explained above.

Figure 3:
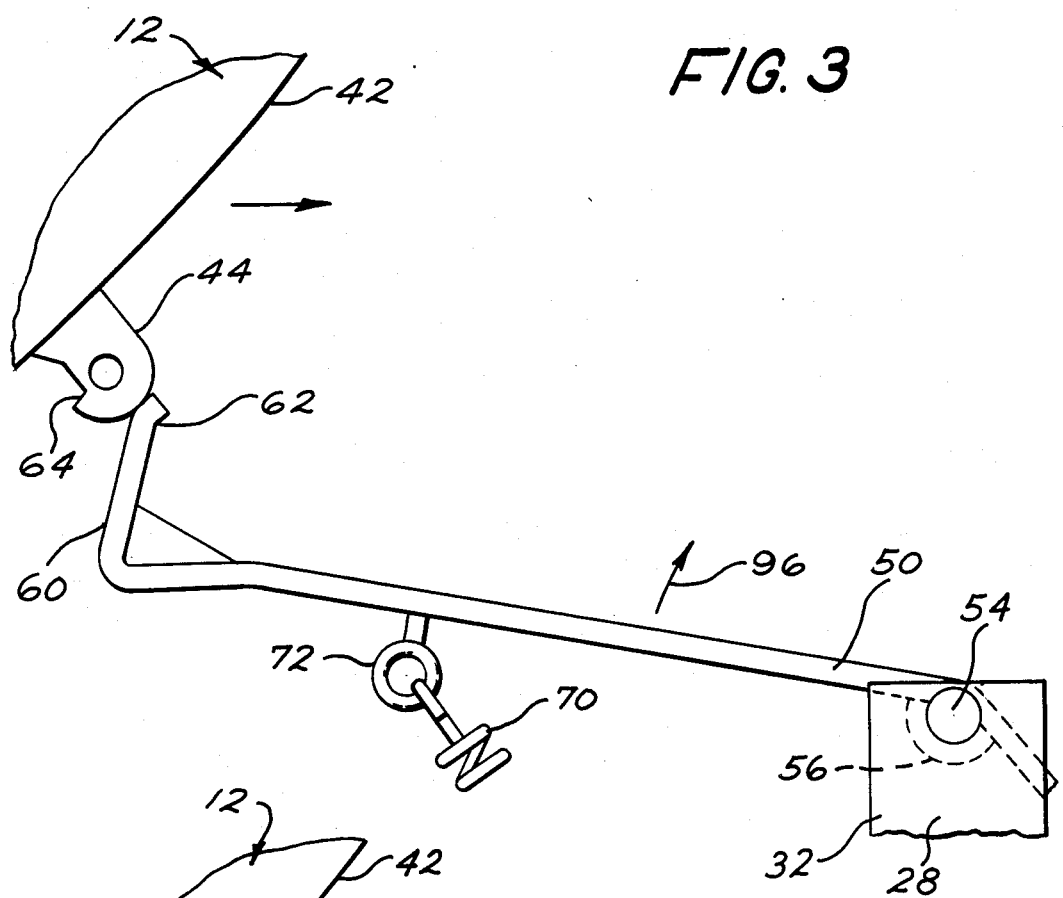
FIG. 3 is a fragmentary, right side, elevational view, on an enlarged scale, showing the interaction of the boat eye with the upwardly and forwardly inclined hook on the rear end of the pivoted latch during a boat-loading operation.
Figure 4:
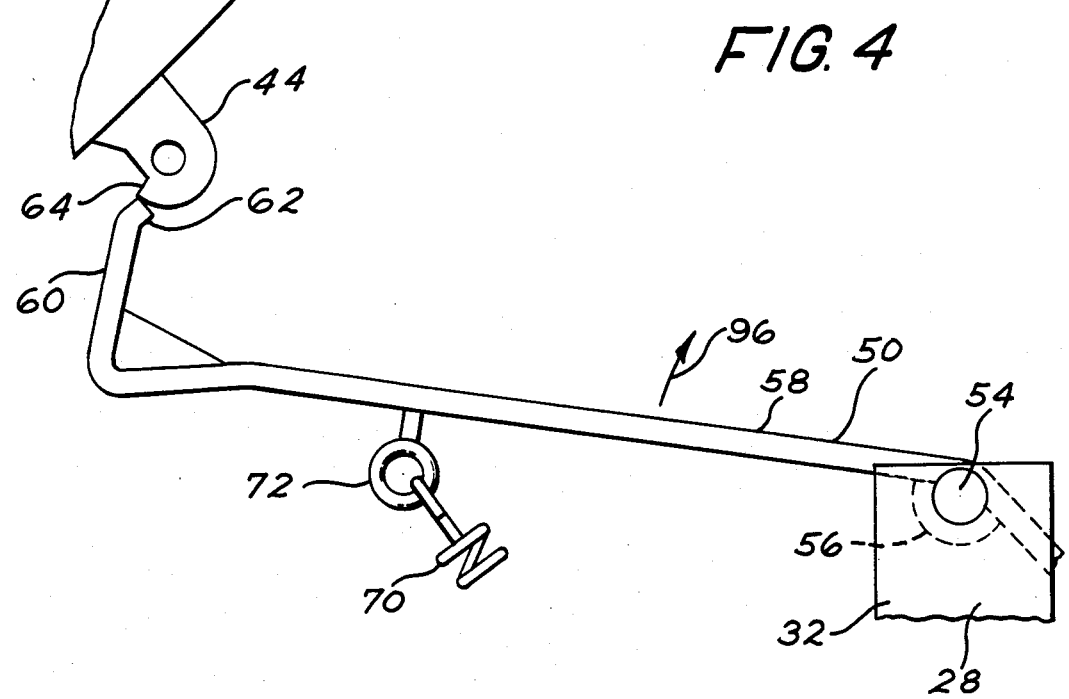
FIG. 4 is a fragmentary view, similar to that of FIG. 3, showing the interaction of the boat eye with the upwardly and forwardly inclined hook as the boat is being loaded onto the trailer to deflect the hook down into a lowered position until the boat eye passes forwardly of the hook, and then the counterweight takes over and returns the hook to the latching position shown in FIG. 2.

Now, for an explanation of the elements of the present invention for incorporation with the fixed upright framework 22 that includes the shelf 26, the second vertical post 28, and the pair of inclined struts 34. The automatic boat latching device of the present invention comprises a pivoted latch 50 which has a transverse pivot 52 near its center, where the pivot is in the form of a through bolt 54 which extends through holes in the pair of parallel plates 30 and 32 that form the second vertical post 28. The underside of the latch 50 has a bearing 56 for receiving the bolt 54 therethrough. The rear half 58 of the latch 50 has an upwardly and forwardly inclined hook 60 formed on its rear edge. The top edge of the hook 60 has a folded lip 62 for engagement with a notched keeper 64 that is formed on the underside of the boat eye 44, as is best seen in FIGS. 3 and 4. The front half 66 of the pivoted latch 50, that is in front of the central pivot 52, is furnished with a counterweight 68 that normally urges the hook 60 in a clockwise direction to a raised position. In other words, the front end 66 of the pivoted latch 50 is weighted so that the pivoted latch normally tends to rotate in a clockwise direction as seen from the right side of the trailer, as in FIG. 2.

Figure 2:
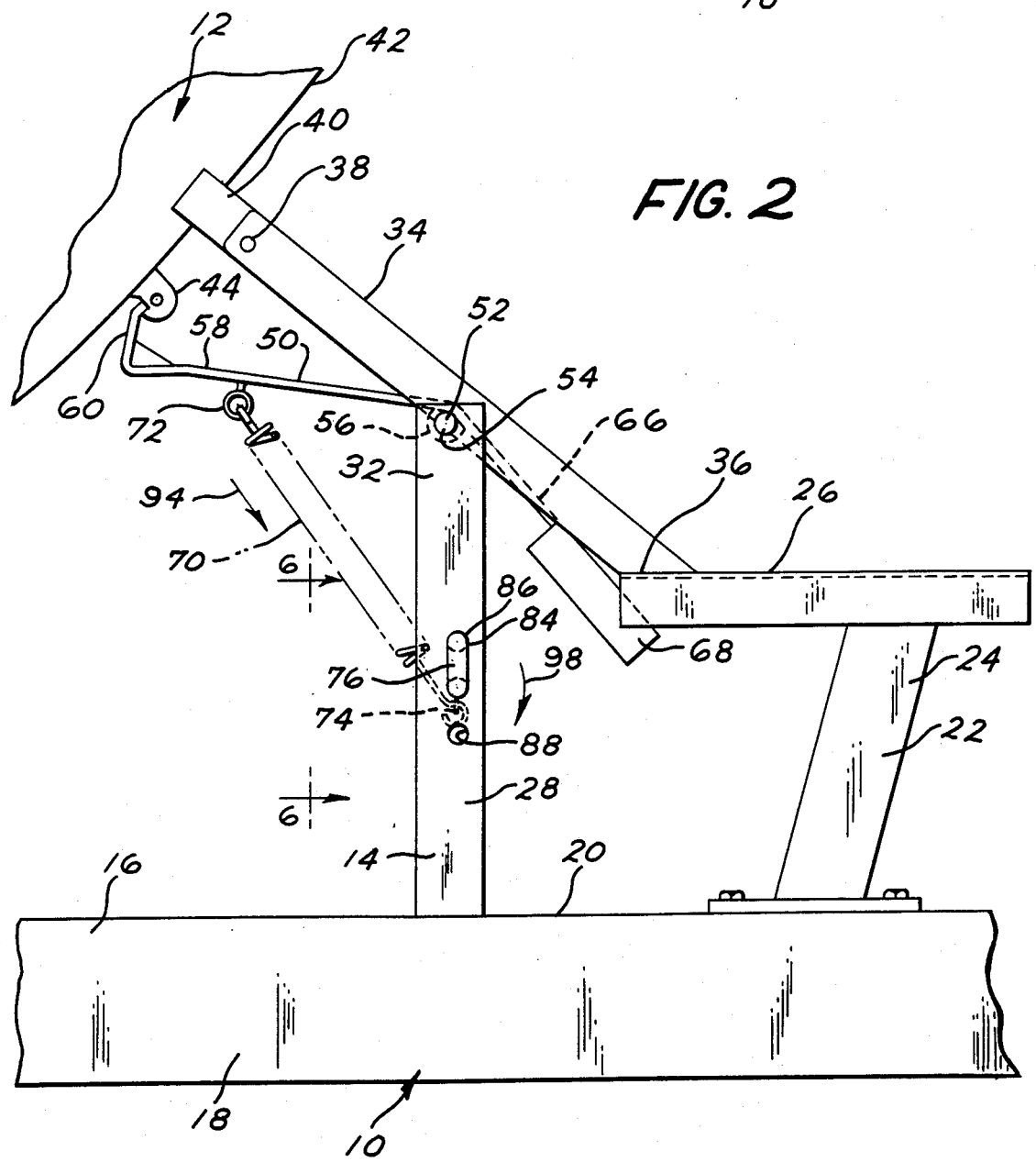
FIG. 2 is a fragmentary, right side, elevational view, on an enlarged scale, of a portion of the front end of the boat trailer of FIG. 1 showing the fixed upright framework of a standard self-loading boat trailer having incorporated therewith the automatic boat latch of the present invention for cooperation with the boat eye mounted under the bow of the boat.

This pivotal action of the latch 50, that is caused by the counterweight 68, is influenced or acted upon by a tension spring 70 which is joined at one end to the underside of the rear half 58 of the pivoted latch by means of a thumbscrew 72 that is threaded into a suitable hole in the latch, as is clear from FIG. 2. The other end of this tension spring 70 is also joined to a thumbscrew 74 which is supported from an adjustable handle 76, in the form of a sliding bolt, that is mounted in the standard framework 14, as is best seen in FIG. 6.

As mentioned earlier, FIG. 6 is a fragmentary elevational view, taken on the Line 6—6 of FIG. 2, looking forwardly of the trailer through the second vertical post 28. This vertical post is formed by the pair of parallel vertical plates 30 and 32. Notice the counterweight 68, supported on the front half 66 of the pivoted latch 50, is shown in the background of this FIG. 6. The adjustable handle 76 is a sliding bolt member, generally in the form of a candy cane, with an elongated bolt portion 78 that is adapted to extend through a pair of aligned holes 80 formed in the parallel plates 30 and 32 respectively. The elongated bolt portion 78 has a locking head 82 outside the plate 32 in the form of a reentrant U-shape, thereby producing a free end 84 that is generally parallel with the elongated bolt portion 78. This free end 84 is adapted to slip into a mating hole 86 in the 12 o'clock position and a mating hole 88 in the 6 o'clock position, as is clear from FIGS. 2, 5 and 6. When this adjustable handle 76 is being installed in this second vertical post 28, a compression spring 90 is threaded onto the elongated bolt portion 78 and held in place between the inner surface of the plate 32 and the thumbscrew 74 that is threaded into a suitable opening in the central portion of the elongated bolt portion 78. Thus, this compression spring 90 tends to shift the adjustable handle 76 to the left in FIG. 6, such that, if the free end 84 of the locking head 82 of the handle were in one or the other of the two mating holes 86 and 88, the compression spring 78 would tend to hold the handle in this locking position until it was purposely changed by pulling on the locking head 82 in an outward position to remove the free end 84 from the mating hole so that the handle could be turned to shift the free end 84 to the opposite mating hole. As seen in FIG. 6, the adjustable handle 76 is held in place within this second vertical post 28 by means of a lock nut 92 formed on the free end of the elongated bolt portion 78 adjacent the vertical plate 30.

Attention is now drawn to a comparison of FIGS. 2 and 6. In both of these Figures, the adjustable handle 76 is set with the free end 84 of the locking head 82 positioned in the OFF position, where the free end is inserted into the mating hole 86 which is in the 12 o'clock position relative to the bolt-receiving hole 80. This term OFF signifies that the operator has set the adjustable handle 76 to an OFF position which renders the automatic latch 50 capable of effecting the unloading of the boat 12 from the trailer 10. In this OFF position, the lower thumbscrew 74 is in a 6 o'clock position, as seen in FIG. 2, which serves to load or stretch the tension spring 70, such that, a retracting force is exerted on the pivoted latch 50 tending to overcome the reverse turning action of the counterweight 68. With the adjustable handle 76 set in its OFF position, as shown in FIG. 2, the boat operator need only climb back into his car and back the trailer 10 into the water, causing the pressure of the water to push against the stern of the boat causing the boat to move forwardly a slight amount until the boat eye 44 is disconnected, or released, from the hook 60 of the pivoted latch 50. Then the tension spring 70 will automatically lower the hook 60, and the boat may tend to float rearwardly off of the trailer and free of the pivoted latch 50. Thus, the positioning of the adjustable handle 76 into the OFF position of FIG. 2 creates a downward force 94, shown by the directional arrow in FIG. 2, that serves to disconnect the hook 60 from the boat eye 44 when the loaded trailer 10 is backed into the water. In this OFF position of the handle 76, the tension spring 70 is loaded, or stretched, to bring about the desired result.

Figure 5:
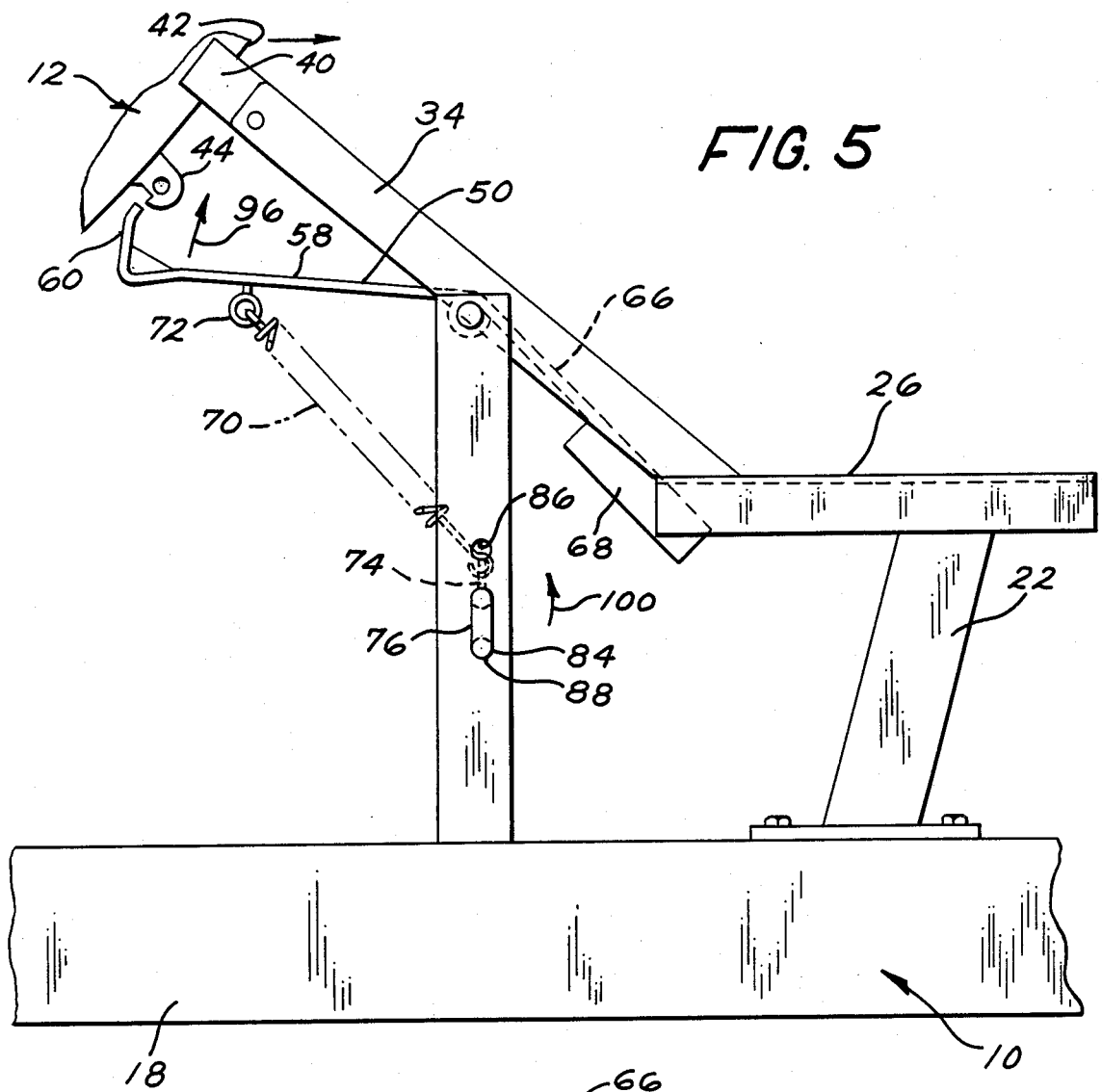
FIG. 5 is a fragmentary view of the front portion of the trailer showing the framework supporting the automatic latch of the present invention, where an adjustable handle is set to the ON position, which designation refers to a boat-loading operation, or boat ON position.

Now, turning to a consideration of FIG. 5, the adjustable handle 76 is set in the ON position, where the free end 84 of the locking head 82 of the handle is positioned in the 6 o'clock position, where the free end 84 is inserted into the mating hole 88. In this ON position, the thumbscrew 74 is in the 12 o'clock position, which serves to relax the tension spring 70 or shorten this spring, such that, the counterweight 68 tends to hold the hook member 60 in a raised position. Thus, the counterweight 68 exerts an upward force 96 that is shown by the directional arrow in FIG. 5. Thus, the adjustable handle is moved from the OFF position of FIG. 2 to the ON position of FIG. 5 by turning the handle in a clockwise direction, as shown by the directional arrow 98 in FIG. 2. As a corollary, the handle is moved from the ON position of FIG. 5 to the OFF position of FIG. 2 by moving the handle in a counter-clockwise direction 100, as shown by the directional arrow in FIG. 5.

FIGS. 3 and 4 have been included to show the interaction of the boat eye 44 with the upwardly and forwardly inclined hook 60 when the adjustable handle 76 is set in the ON position during a boat-loading operation. That is the condition of both FIGS. 3 and 4. In FIG. 3, the boat 12 is moving forwardly to the right on the trailer 10, and the boat eye 44 has contacted the upwardly and forwardly inclined hook 60 causing the hook to slide downwardly so that the boat eye can slip over the folded lip 62, as best seen in FIG. 4. This is the condition of the automatic latch 50, in FIG. 5, where the boat 12 has come to rest with the bow 42 in the bow-receiving cradle 40, and the counterweight 68 will cause the latch 50 to turn in a clock wise direction, as seen from the right side of the trailer in FIG. 5, until the hook 60 interlocks with the notched keeper 64 of the boat eye 44.

It is to be understood by those skilled in this art that the boat trailer 10 is a self-loading trailer, although this has not been described in detail since it does not form part of the present invention. It should suffice to say that this type of self-loading trailer is readily available on the market, and it enables the boat owner to propel the boat onto the submerged rear end of the trailer and run the boat forwardly until the boat eye 44 is automatically caught by the hook 60 of the pivoted latch 50. As the trailer is removed from the water, the boat will slide rearwardly slightly until the keeper 64 is firmly interlocked with the inclined lip 62 of the hook 60.

FIG. 7 shows a fragmentary, right side, elevational view of the automatic latch 110 of the second modification of the present invention. Element 18 is the box beam of the self-loading trailer chassis 16 of the type that is shown in FIG. 1. This automatic latch 110 is supported on a vertical post 112 that has a flat base plate 114 that is fastened to the side box beam 18 by means of the U-shaped clamps 116. This vertical post 112 is fitted with a telescopic extension 118 that slips down over the top of the post. The top portion of the vertical post 112 includes a plurality of vertically spaced holes 120 for receiving a mounting bolt 122 that extends through a mating hole in the telescopic extension 118 to enable the vertical adjustment of the height of the telescopic extension 118 relative to the vertical post 112. This adjustment is necessary in order for this automatic latch 110 to be a universal latch for use with boats and trailers of many different makes and sizes. The upper end of this telescopic extension 118 is provided with a mounting bolt 124. Cooperating with this second mounting bolt 124 is a bow-receiving cradle 126, which is supported from a pair of parallel struts 128 and 130 which are held to the opposite sides of the telescopic extension 118 by means of the second mounting bolt 124. These parallel struts 128 and 130 are also provided with a plurality of vertically spaced holes 132 so as to be able to adjust the vertical height of the bow-receiving cradle 126 relative to the telescopic extension 118 and the vertical post 112.

Supported from the rear side of the telescopic extension 118 is a upwardly and rearwardly inclined beam 138. Near the free end of this beam 138 is a third mounting bolt 140 which connects a pivoted latch member 142 to the beam 138. This pivoted latch member 142 of this second modification is related to the pivoted latch member 50 of the first modification of FIG. 2. However, they are different in nature. This second pivoted latch member 142 is pivoted adjacent its center portion by means of the third mounting bolt 140. However, this second pivoted latch member 142 is much more compact and rugged in nature from the first pivoted latch member 50 of FIG. 2. The location of this mounting bolt 140 serves as a datum plane, or line. The part of the pivoted latch member 142 that extends forwardly of the trailer relative to this mounting bolt 140 is considered as the forward, or front end of the pivoted latch member 142, while the portion of the pivoted latch member 142 that lies to the rear of the mounting bolt 140 is considered as the rear end of the latch. As seen in FIG. 7, the front end 144 of the pivoted latch member 142 is fitted with both an inclined hook portion 146 and 148 as well as with a counterweight, or heavyweight, 150. This term "counterweight," or "heavyweight," 150 means that the front end of the pivoted latch member 142 is heavier than the rear end 152, and this means that the normal action of this pivoted latch member is to turn in a clockwise direction, shown by the lead line 154 in FIG. 7. This counterweighted front end 144 is made up of the inclined hook portion 146 as well as the inclined hook portion 148, coupled with a pair of parallel side plates 156 which are disposed at the opposite sides of the inclined beam 138 and are provided with a suitable hole (not shown) for receiving the third mounting bolt 140, as will be well understood by those skilled in this art. In the absence of any other means of support, this pivoted latch member 142 would normally pivot clockwise and assume the horizontal position shown in full lines in FIG. 12.

Figure 9:
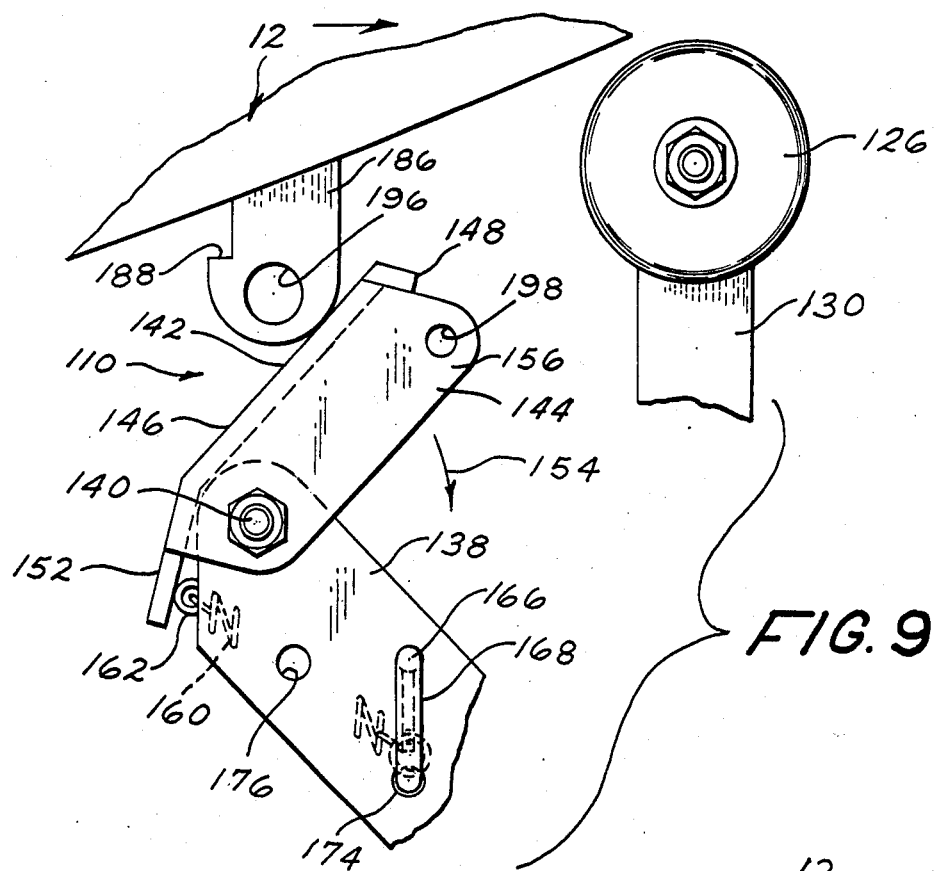
FIG. 9 is a fragmentary, right side, elevational view, on an enlarged scale, showing the interaction of the boat eye with the inclined hook of the pivoted latch member during a boat-loading operation, similar to that of FIG. 3 of the first modification.
Figure 11:
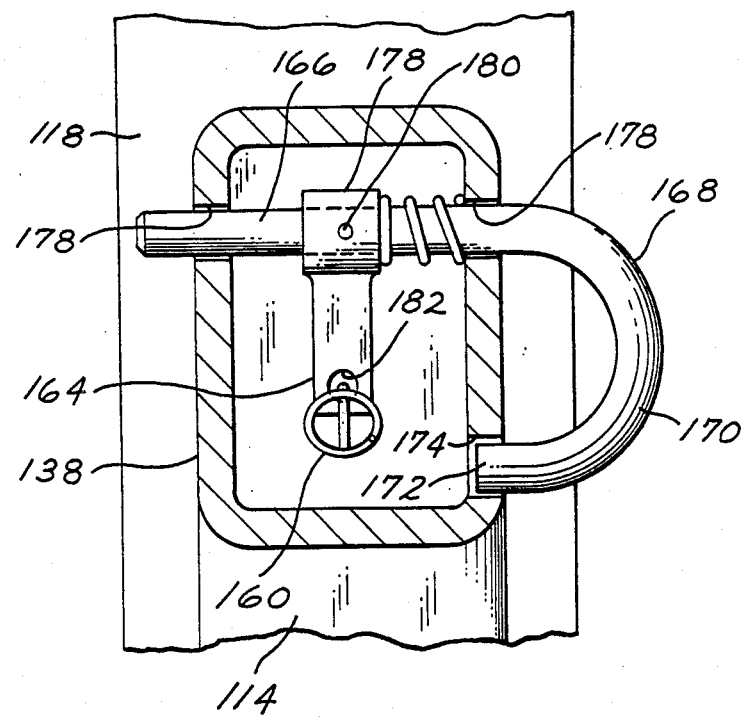
FIG. 11 is a fragmentary elevational view, taken on the Line 11—11 of FIG. 7, showing the nature of the adjustable handle that is capable of setting the tension spring for either cooperating with the counterweight action or opposing the counterweight action.
Figure 13:
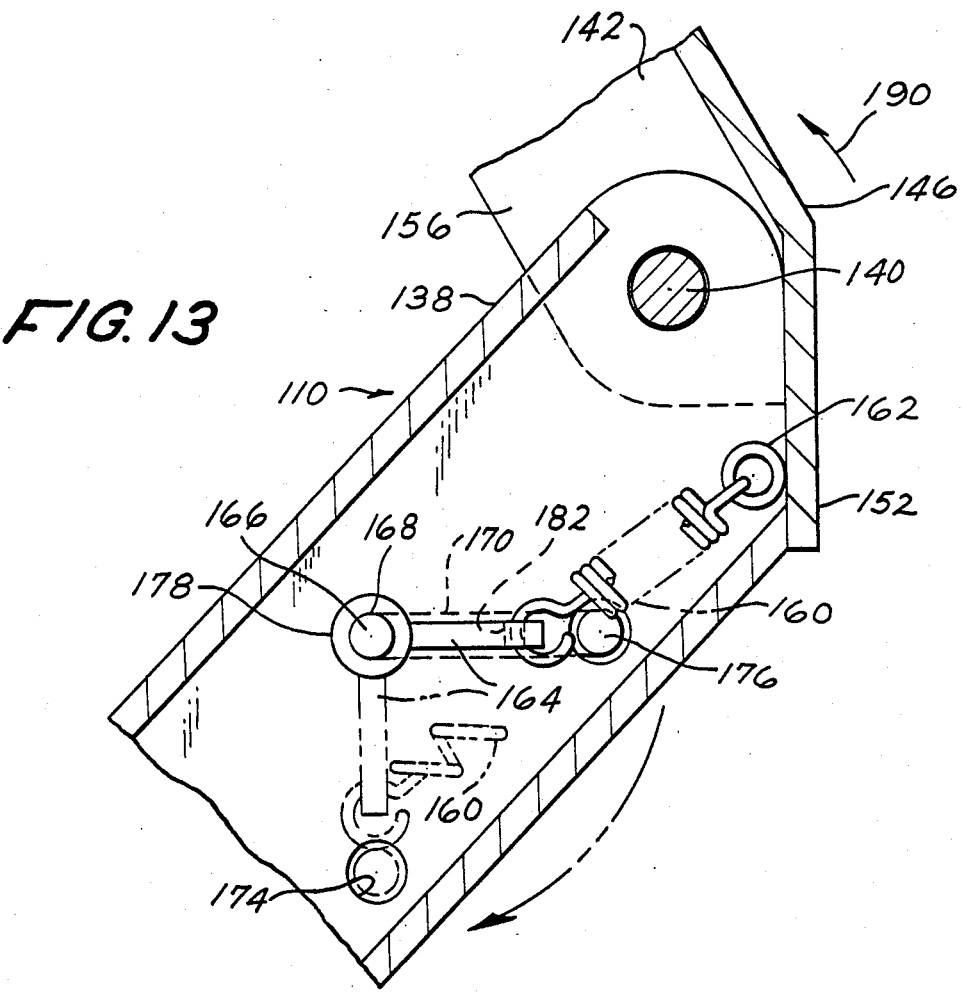
FIG. 13 is a fragmentary, cross-sectional, elevational view, on an enlarged scale, taken on the Line 13—13 of FIG. 8 to show the adjustable handle and the tension spring in full view in the OFF position.

This second modification of the present invention 110 also is provided with a tension spring 160 that is of a nature similar to tension spring 70 of the first modification of FIG. 2. The nature of this tension spring 160 is perhaps best illustrated in dotted lines in FIG. 9. One end of this tension spring 160 is connected to a ring member 162 that is attached to the underside of the rear end 152 of the pivoted latch member 142. The other end of this tension spring is joined to a fixed bracket 164 that is mounted on the sliding bolt 166 of an adjustable handle 168, as is best seen in FIGS. 11 and 13. This adjustable handle 168 is similar in nature to the adjustable handle 76 of the first modification of the present invention. This adjustable handle 168 is a sliding bolt member 166 that is generally in the form of a candy cane since it has a locking head 170 in the form of a reentrant U-shape having a free end 172 that is adapted to slip into a mating hole 174 located in the 6 o'clock position, as is shown in the right side elevational view of FIG. 7, as well as into an alternate mating hole 176, which is located in the 9 o'clock position, as is shown in the right side elevational view of FIG. 7. The sliding bolt member 166 of the adjustable handle 168 is mounted in a pair of aligned holes 178 formed in the beam 138. The fixed bracket 164 has a bearing 178 that is capable of sliding along the length of the sliding bolt member 166. A setscrew 180 is used to fasten this bearing in place so as to hold the bracket 164 fixed along the length of the sliding bolt 166. The free end of this bracket 164 is fitted with a hole 182 for receiving the hook 184 at one end of the tension spring 160, as is best seen in FIG. 13.

Figure 10:
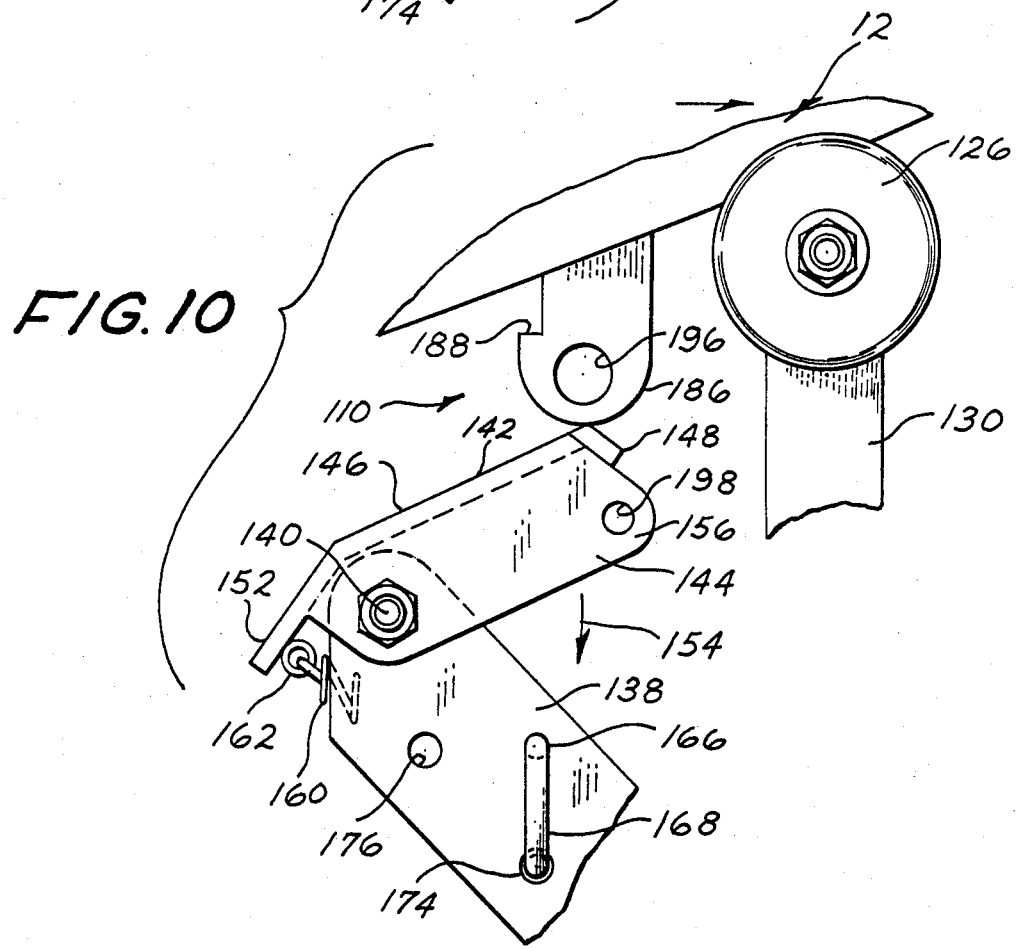
FIG. 10 is another fragmentary, right side, elevational view, similar to that of FIG. 9, showing the boat moving further to the right onto the trailer and approaching the bow-receiving cradle.

When the adjustable handle 168 is in the 6 o'clock position of FIG. 7 and FIG. 11, the tension spring 160 is in its extended, or loaded position, which is the position which is the "ON" position for use in loading the boat onto the trailer. In this ON position, the pivoted latch member 142 is normally urged by the extended, or loaded tension spring 160 into the raised position, as shown in FIG. 7. As the boat moves forwardly on the trailer, the boat eye 186 will engage the upwardly inclined surface 146 of the front end of the pivoted latch member 142 and cause this pivoted latch member to pivot in a clockwise direction, as shown by the lead line 154. The continued movement of the boat to the front of the trailer is shown in FIG. 10 until the boat eye 186 moves beyond the inclined hook 148. Then, the tension spring 160 will cause the pivoted latch member 142 to snap upwardly into the dotted line position shown in FIG. 12. The boat eye 186 includes a keeper 188 for interlocking with the inclined hook portion 148 at the front end of the pivoted latch member 142.

When it comes time for the operator to unload the boat from the trailer, then the operator will set the adjustable handle 168 into the 9 o'clock position, as shown in FIG. 12, when the free end 172 is engaged within the mating hole 176. This 9 o'clock position is shown in the rear cross-sectional view of FIG. 13 when the tension in the tension spring 160 is relieved, so that the counterweight 150 will normally cause the pivoted latch member 142 to move in a counterclockwise position, as shown by the lead line 190 in FIG. 13, which would be a clockwise direction, as shown by the lead line 192 in the front side view of FIG. 12.

Having described above the novel improvement invention of the automatic latch of the second modification 110 it should readily be apparent to those skilled in this art that the adjustable handle 168 may be preset into an ON 6 o'clock position of FIG. 7, or into an OFF 9 o'clock position of FIG. 12, and then left unattended. The automatic nature of the pivoted latch member 142 takes over and does the rest.

In loading the boat 12 onto the self-loading trailer 10 when using the improved second modification 110, the operator backs his car and trailer 10 down the inclined boat ramp until the rear end of the trailer is completely submerged in the water. Then he sets his car parking brakes. Then he sets the adjustable handle 168 into the ON 6 o'clock position of FIG. 7. The boat 12 is driven by its own power onto the trailer 10 and it stops about 12 inches from the pivoted latch member 142. Then the operator nudges the throttle to ease the boat forward slowly, and the boat eye 186 strikes the pivoted latch member 142 and pivots it clockwise in FIG. 9. The boat continues forwardly to the right in FIG. 10 until the boat eye passes over and beyond the inclined hook portion 148. Then the loaded or extended tension spring 160 will automatically return the pivoted latch member 142 counterclockwise to the raised position of FIG. 7. The operator turns off his motor and the notch or keeper 188 of the boat eye will be interlocked under the inclined hook portion 148.

The boat eye include a through hole 196, while the counterweight side plates 156 include aligned holes 198 so when the boat 12 is completely loaded on the trailer a cinch pin or bolt (not shown) could be installed through the holes 198, 196 and 198 to provide a second locking means between the boat 12 and the automatic latch member 142 for safety use during travel of the boat and its trailer across country.

When the boat 12 is to be unloaded into the water, the operator will reset the adjustable handle 168 into the OFF 9 o'clock position of FIG. 12. Of course, at the time the pivoted latch member 142 is interlocked with the notch or keeper 188 of the boat eye 186, as seen in FIG. 7. Then the operator will back his car and trailer down the inclined boat ramp until the rear of the boat trailer becomes completely submerged and the motor and transom of the boat dip into the water. The resistance of the water to the entrance of the motor prop and transom of the boat into the water will cause the movement of the boat to slow down and the boat to shift forwardly slightly as the trailer continues its downward movement into the water. This relative movement of the boat 12 and trailer 10 will automatically disengage the notch or keeper 188 of the boat eye 186 from the inclined hook portion 148, and this allows the counterweight 150 to drop the pivoted latch member 142 to the horizontal full line position of FIG. 12. Then the continued downward movement of the trailer 10 will carry the boat rearwardly of the automatic latch 110, and then the operator in the car will brake the car and trailer, and the boat 12 will be free floating. Because spectators watching these boat-loading and unloading operations can't see the tension spring 160 and its operation, because it is hidden in the beam 138, they have been known to label this automatic latch as MAGIC. Of course, it isn't. But it is a slick and reliable and well built design. It has been identified by the trademark INSTA-Winch TM because it serves the function of the winch, without using a winch, and it works instantly or automatically.

Modifications of this invention will occur to those skilled in this art. Therefore, it is to be understood that this invention is not limited to the particular embodiments disclosed but that it is intended to cover all modifications which are within the true spirit and scope of this invention as claimed.

What is claimed is:

1. An automatic boat latching device adapted to be mounted to a fixed upright framework on the front of a self-loading boat trailer, where the upright framework includes a bow-receiving cradle, said latching device comprising:
   a. a latch member adapted to be pivotally mounted in a vertical plane to the upright framework, the rear end of the latch member having an upwardly and forwardly inclined hook while the front end of the latch member having a counterweight normally urging the hook to a raised position;
   b. whereby the forward loading movement of the boat onto the trailer causes a boat eye mounted on the bow of the boat to deflect the inclined hook downwardly into a lowered position until the boat eye passes thereover forwardly of the inclined hook and then the counterweight returns the hook to a raised position where the hook interlocks with the boat eye for locking the boat to the trailer; and
   c. an adjustable handle mounted to the framework, and a tension spring means joined at one end to the hook portion of the pivoted latch member and at its other end to the adjustable handle;
   d. where the handle may be locked in one position to relax the tension of the spring means during a boat-loading operation onto the trailer, and may be locked in an alternate position to increase the tension of the spring means during a boat-unloading operation from the trailer.

2. The invention as recited in claim 1 wherein the said pivoted latch member is positioned below the said bow-receiving cradle so that when the said hook is interlocked with the said boat eye, the bow of the boat will be braced within the said bow-receiving cradle, so that the cradle retards further forward movement of the boat relative to the trailer, and the hook restrains rearward movement of the boat relative to the trailer.

3. The invention as recited in claim 1 wherein the said tension spring means of the adjustable handle acts in conjunction with the counterweight of the pivoted latch member during a boat-loading operation onto the trailer when the spring in a relaxed mode positions the inclined hook to be deflected downwardly by the contact of the boat eye and then allows the counterweight to control the automatic latching means, while the said tension spring means of the adjustable handle when in an increased tension mode in a boat-unloading operation acts to overcome the action of the counterweight and urges the hook downwardly from interlocking with the boat eye when the boat is backed into the water by the trailer, thereby jarring the boat eye forwardly momentarily of the interlocking hook to unhook the boat eye from the pivoted latch.

4. The invention as recited in claim 3 wherein the said upwardly and forwardly inclined hook of the said pivoted latch member has a forwardly folded lip on its top edge, while the said boat eye has a notched keeper on its underside for interlocking with the folded lip of the hook.

5. An automatic boat latching device adapted to be mounted to a fixed upright framework on the front of a self-loading boat trailer, where the upright framework includes a bow-receiving cradle, said latching device comprising:
   a. a latch member adapted to be pivotally mounted in a vertical plane to the upright framework, the rear end of the latch member having an upwardly and forwardly inclined hook while the front end of the latch member having a counterweight normally urging the hook to a raised position;
   b. whereby the forward loading movement of the boat onto the trailer causes a boat eye mounted on the bow of the boat to deflect the inclined hook downwardly into a lowered position until the boat eye passes thereover forwardly of the inclined hook and then the counterweight returns the hook to a raised position where the hook interlocks with the boat eye for locking the boat to the trailer; and
   c. an adjustable handle mounted to the framework, and a tension spring means joined at one end to the hook portion of the pivoted latch member and at its other end to the adjustable handle;
   d. where the handle may be locked in one position to relax the tension of the spring means during a boat-loading operation onto the trailer, and may be locked in an alternate position to incresase the tension of the spring means during a boat-unloading operation from the trailer;
   e. wherein the said pivoted latch member is positioned below the said bow-receiving cradle so that when the said hook is interlocked with the said boat eye, the bow of the boat will be braced within the said bow-receiving cradle, so that the cradle retards further forward movement of the boat relative to the trailer, and the hook restrains rearward movement of the boat relative to the trailer;
   f. wherein the said adjustable handle is a sliding bolt member which has a locking head at one end, the said upright framework including a pair of spaced locking keepers, each keeper for receiving the said locking head of the sliding bolt in a separate locked condition, and a second spring means on the sliding bolt member for urging the locking head of the handle into engagement with either one of the locking keepers, whereby the said second spring means may be compressed for removing the locking head of the sliding bolt from one of the locking keepers for rotating the adjustable handle into locking engagement with the other locking keeper.

6. The invention as recited in claim 5 wherein the said sliding bolt member has a locking head in the shape of a reentrant U-shape, and the said pair of spaced locking keepers are simple holes, each for receiving the free end of the reentrant U-shaped head.

7. An automatic boat latching device adapted to be mounted to a fixed upright framework on the front of a self-loading boat trailer, where the upright framework includes a bow-receiving cradle, said latching device comprising:
   a. a latch member adapted to be pivotally mounted in a vertical plane to the upright framework, one end of the pivoted latch member having an upwardly and forwardly inclined hook, while the other end of the pivoted latch member is provided with a pivoting means normally urging the upwardly and forwardly inclined hook into a raised position;
   b. whereby the forward loading movement of the boat onto the trailer causes a boat eye that is mounted on the bow of the boat to deflect the inclined hook downwardly into a lowered position until the boat eye passes thereover forwardly of the inclined hook, and then the said pivoting means returns the hook to a raised position where the hook interlocks with the boat eye for locking the boat to the trailer;
   c. an adjustable handle mounted to the framework, and a tension spring means joined at one end to the adjustable handle while the other end of the tension spring means is joined to the pivoted latch member;
   d. where the handle may be locked in one position to relax the tension of the spring means during one of the boat and trailer operations, and may be locked in an alternate tension spring-loading or extended position during an alternate boat and trailer operation.

8. The invention as recited in claim 7 wherein the said pivoting means is in the form of a loaded or extended tension spring.

9. The invention as recited in claim 7 wherein the said pivoting means is in the form of a counterweight mounted on the end of the pivoted latch member that is opposite the upwardly and forwardly inclined hook.

10. An automatic boat latching device adapted to be mounted to a fixed upright framework on the front of a self-loading boat trailer, where the upright framework includes a bow-receiving cradle, said latching device comprising:
   a. a latch member adapted to be pivotally mounted in a vertical plane to the upright framework, one end of the pivoted latch member having an upwardly and forwardly inclined hook, while the other end of the pivoted latch member is provided with a pivoting means normally urging the upwardly and forwardly inclined hook into a rased position;
   b. whereby the forward loading movement of the boat onto the trailer causes a boat eye that is mounted on the bow of the boat to deflect the inclined hook downwardly into a lowered position until the boat eye passes thereover forwardly of the inclined hook, and then the said pivoting means returns the hook to a raised position where the hook interlocks with the boat eye for locking the boat to the trailer;

c. an adjustable handle mounted to the framework and a tension spring means joined at one end to the adjustable handle while the other end of the tension spring means is joined to the pivoted latch member;

d. where the handle may be locked in one position to relax the tension of the spring means during one of the boat and trailer operations, and may be locked in an alternate tension spring-loading or extended position during an alternate boat and trailer operation;

e. wherein the said upwardly and forwardly inclined hook is arranged on the front end of the pivoted latch member, and this front end also includes a counterweight, or heavyweight, which normally urges this pivoted latch member into a lowered, generally horizontal, position, and whereby the said pivoting means is in the form of a loaded or extended tension spring that is joined at one end to the rear end of the pivoted latch member and is joined at its opposite end to the adjustable handle.

11. An automatic boat latching device adapted to be mounted to a fixed upright framework on the front portion of a self-loading boat trailer, where the upright framework includes a bow-receiving cradle, said latching device comprising:

a. a vertical latch member adapted to be pivotally mounted intermediate its ends to the upright framework, one end of the latch member having an upwardly inclined hook means adapted to extend toward the front end of the trailer;

b. one end of the latch member being heavier than the other end of the latch member so as to serve as a counterweight means that normally tends to pivot the latch member in one direction;

c. and an adjustable tension spring means joined at a first end to the latch member on the side of the pivoted latch member that does not include the heavier counterweight means; and adjustable handle means mounted to the framework and having a loading and an unloading position, while the second end of the tension spring means is joined to the handle means so that the tension spring means acts in opposition to the counterweight means;

d. whereby the handle may be manually locked in one position to relax the tension spring means to allow the counterweight means of the latch member to overcome the tension spring means and urge the pivoted latch member in one direction, and the handle may be locked into a second position to load the tension spring means to overcome the normal turning action of the counterweight means of the latch member and operate the latch member in the opposite direction;

e. whereby the forward loading movement of the boat onto the trailer causes a boat eye mounted on the bow of the boat to deflect the upwardly inclined hook means into a lowered position until the boat eye passes forwardly thereof, then either the counterweight means of the latch member or the tension spring means returns the hook means to a raised position where the hook means interlocks with the boat eye;

f. while the rearward unloading movement of the boat from the trailer as the boat is backed into the water at a loading ramp causes the boat to shift forward slightly and the boat eye to become disengaged from the hook means, and either the counterweight means of the latch member or the tension spring means serves to lower the hook means from engaging the boat eye so that the boat may be lowered into the water and separated from the trailer.

12. The invention as recited in claim 11 where in one position of the adjustable handle means, the counterweight means is used to dictate the direction of pivot of the latch member, while in the other position of the handle means, the tension spring means serves to dictate the direction of movement of the latch member.

13. The invention as recited in claim 12 wherein the said upwardly inclined hook means is at one end of the pivoted latch member, while the counterweight means is at the opposite end of the pivoted latch member.

14. An automatic boat latching device adapted to be mounted to a fixed upright framework on the front portion of a self-loading boat trailer, where the upright framework includes a bow-receiving cradle, said latching device comprsing:

a. a vertical latch member adapted to be pivotally mounted intermediate its ends to the upright framework, one end of the latch member having an upwardly inclined hook means adapted to extend toward the front end of the trailer;

b. one end of the latch member being heavier than the other end of the latch member so as to serve as a counterweight means that normally tends to pivot the latch member in one direction;

c. and an adjustable tension spring means joined at a first end to the latch member on the side of the pivoted latch member that does not include the heavier counterweight means, and adjustable handle means mounted to the framework and having a loading and an unloading position, while the second end of the tension spring means is joined to the handle means so that the tension spring means acts in opposition to the counterweight means;

d. whereby the handle may be manually locked in one position to relax the tension spring means to allow the counterweight means of the latch member to overcome the tension spring means and urge the pivoted latch member in one direction, and the handle may be locked into a second position to load the tension spring means to overcome the normal turning action of the counterweight means of the latch member and operate the latch member in the opposite direction;

e. whereby the forward loading movement of the boat onto the trailer causes a boat eye mounted on the bow of the boat to deflect the upwardly inclined hook means into a lowered position until the boat eye passes forwardly thereof, then either the counterweight means of the latch member or the tension spring means returns the hook means to a raised position where the hook means interlocks with the boat eye;

f. while the rearward unloading movement of the boat from the trailer as the boat is backed into the water at a loading ramp causes the boat to shift forward slightly and the boat eye to become disengaged from the hook means, and either the counterweight means of the latch member or the tension spring means serves to lower the hook means from engaging the boat eye so that the boat may be lowered into the water and separated from the trailer;

g. where in one position of the adjustable handle means, the counterweight means is used to dictate the direction of pivot of the latch member, while in the other position of the handle means, the tension spring means serves to dictate the direction of movement of the latch member;

h. wherein both the upwardly inclined hook means and the counterweight means are at the same end of the pivoted latch member.

* * * * *